United States Patent
Bulgrien et al.

(10) Patent No.: US 9,283,965 B2
(45) Date of Patent: Mar. 15, 2016

(54) SYSTEM AND METHOD FOR ENHANCING THE PERFORMANCE OF A WORK VEHICLE

(71) Applicant: CNH Industrial America, LLC, New Holland, PA (US)

(72) Inventors: Garth Bulgrien, Ephrata, PA (US); Mark Krogen, West Fargo, ND (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/520,456

(22) Filed: Oct. 22, 2014

(65) Prior Publication Data

US 2015/0175165 A1    Jun. 25, 2015

Related U.S. Application Data

(60) Provisional application No. 61/917,979, filed on Dec. 19, 2013.

(51) Int. Cl.
| | |
|---|---|
| *B60W 10/04* | (2006.01) |
| *B60W 30/184* | (2012.01) |
| *B60W 10/06* | (2006.01) |
| *B60W 10/10* | (2012.01) |
| *B60W 30/188* | (2012.01) |
| *B60W 10/11* | (2012.01) |
| *B60W 50/00* | (2006.01) |
| *F16H 63/50* | (2006.01) |

(52) U.S. Cl.
CPC .......... *B60W 30/1846* (2013.01); *B60W 10/06* (2013.01); *B60W 10/10* (2013.01); *B60W 10/11* (2013.01); *B60W 30/184* (2013.01); *B60W 30/188* (2013.01); *B60W 30/1882* (2013.01); *B60W 2050/0026* (2013.01); *B60W 2510/104* (2013.01); *B60W 2710/0666* (2013.01); *B60W 2710/105* (2013.01); *B60Y 2200/41* (2013.01); *F16H 2063/508* (2013.01); *Y10T 477/679* (2015.01)

(58) Field of Classification Search
None
See application file for complete search history.

(56) References Cited

U.S. PATENT DOCUMENTS

| | | | | |
|---|---|---|---|---|
| 4,889,014 | A * | 12/1989 | Iwata | 477/101 |
| 5,679,096 | A * | 10/1997 | Stine et al. | 477/111 |
| 5,738,606 | A * | 4/1998 | Bellinger | 477/111 |
| 5,797,110 | A * | 8/1998 | Braun et al. | 701/84 |
| 6,064,934 | A * | 5/2000 | Zhang | 701/51 |
| 6,511,399 | B2 * | 1/2003 | McCollum Etchason et al. | 477/107 |

(Continued)

FOREIGN PATENT DOCUMENTS

EP    2426022 A1    3/2012

*Primary Examiner* — Dirk Wright
(74) *Attorney, Agent, or Firm* — Sue C. Watson

(57) ABSTRACT

A method for enhancing the performance of a work vehicle may generally include storing a reference transmission torque and a reference transmission speed for a transmission of the work vehicle. At least one of the reference transmission torque or the reference transmission speed may be determined based at least in part on drivetrain life data associated with at least one drivetrain component of the work vehicle. In addition, the method may include determining a current transmission speed for the transmission, determining a transmission output torque limit for the transmission based on the current transmission speed, the reference transmission torque and the reference transmission speed and controlling an engine of the work vehicle such that a transmission output torque of the transmission does not exceed the transmission output torque limit while the transmission is being operated at the current transmission speed.

20 Claims, 7 Drawing Sheets

(56) References Cited

U.S. PATENT DOCUMENTS

| | | |
|---|---|---|
| 6,565,481 B2 | 5/2003 | Toukura et al. |
| 6,636,795 B1 * | 10/2003 | Morscheck ............... 701/54 |
| 7,121,979 B2 * | 10/2006 | Steen et al. ............... 477/111 |
| 7,144,350 B2 * | 12/2006 | Maxon et al. ............... 477/107 |
| 8,442,732 B1 * | 5/2013 | Steeby ............... 701/54 |
| 8,948,942 B2 * | 2/2015 | McGrogan et al. ............. 701/22 |
| 9,126,598 B2 * | 9/2015 | Hindman et al. |
| 2012/0220425 A1 | 8/2012 | Field et al. |
| 2012/0296538 A1 | 11/2012 | Kresse |
| 2012/0323416 A1 | 12/2012 | McGrogan et al. |

* cited by examiner

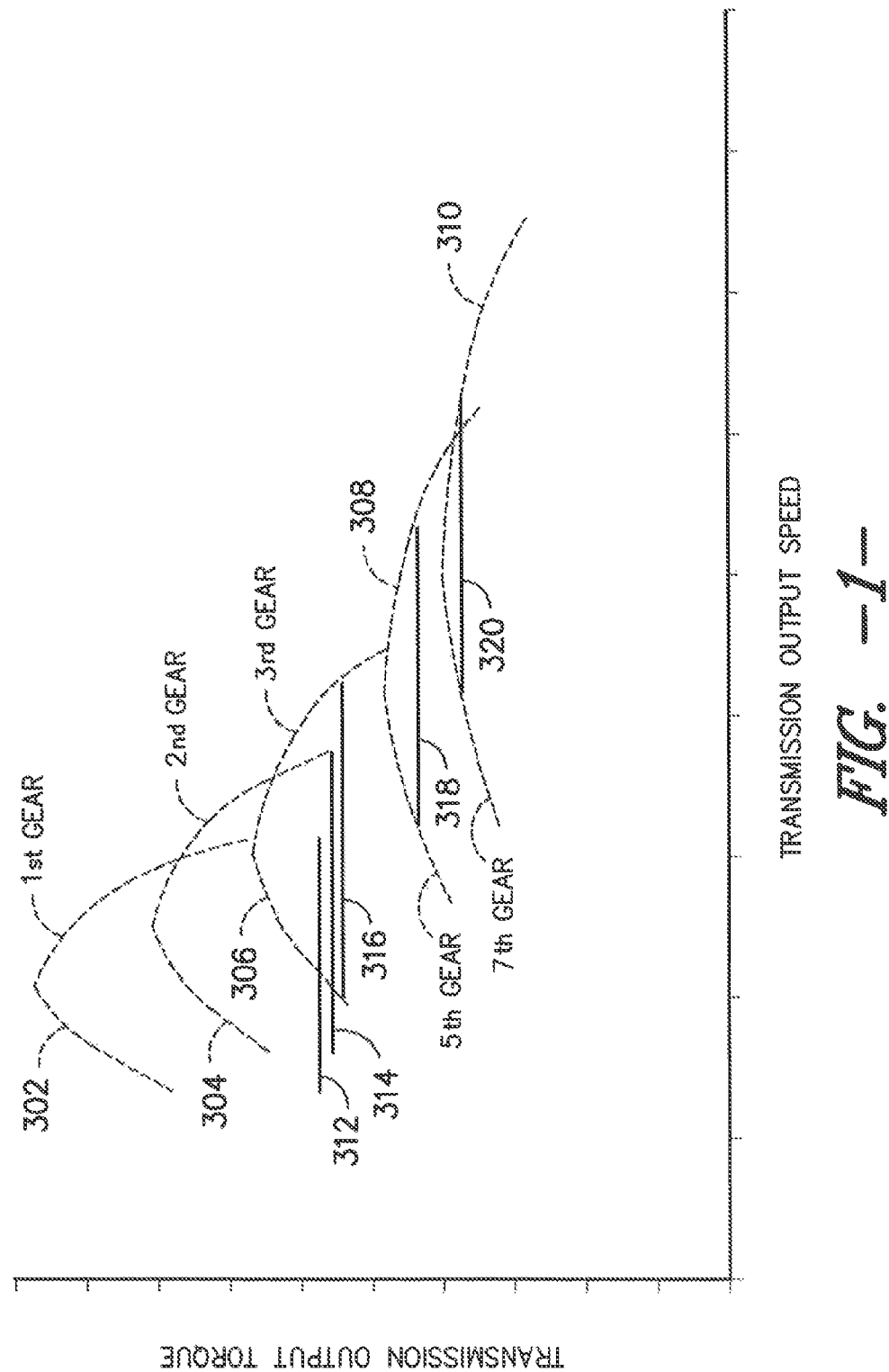
FIG. -1-

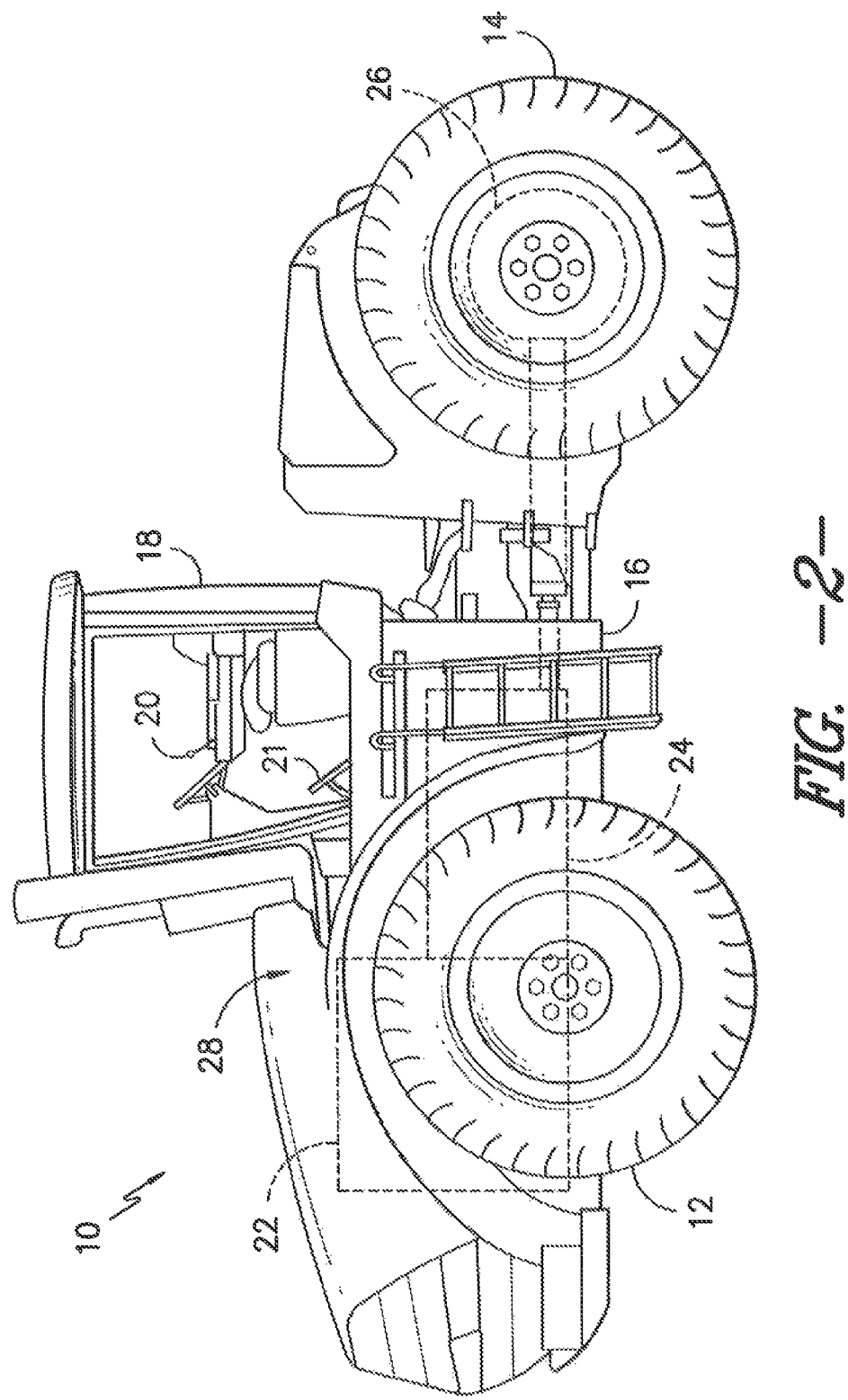
FIG. -2-

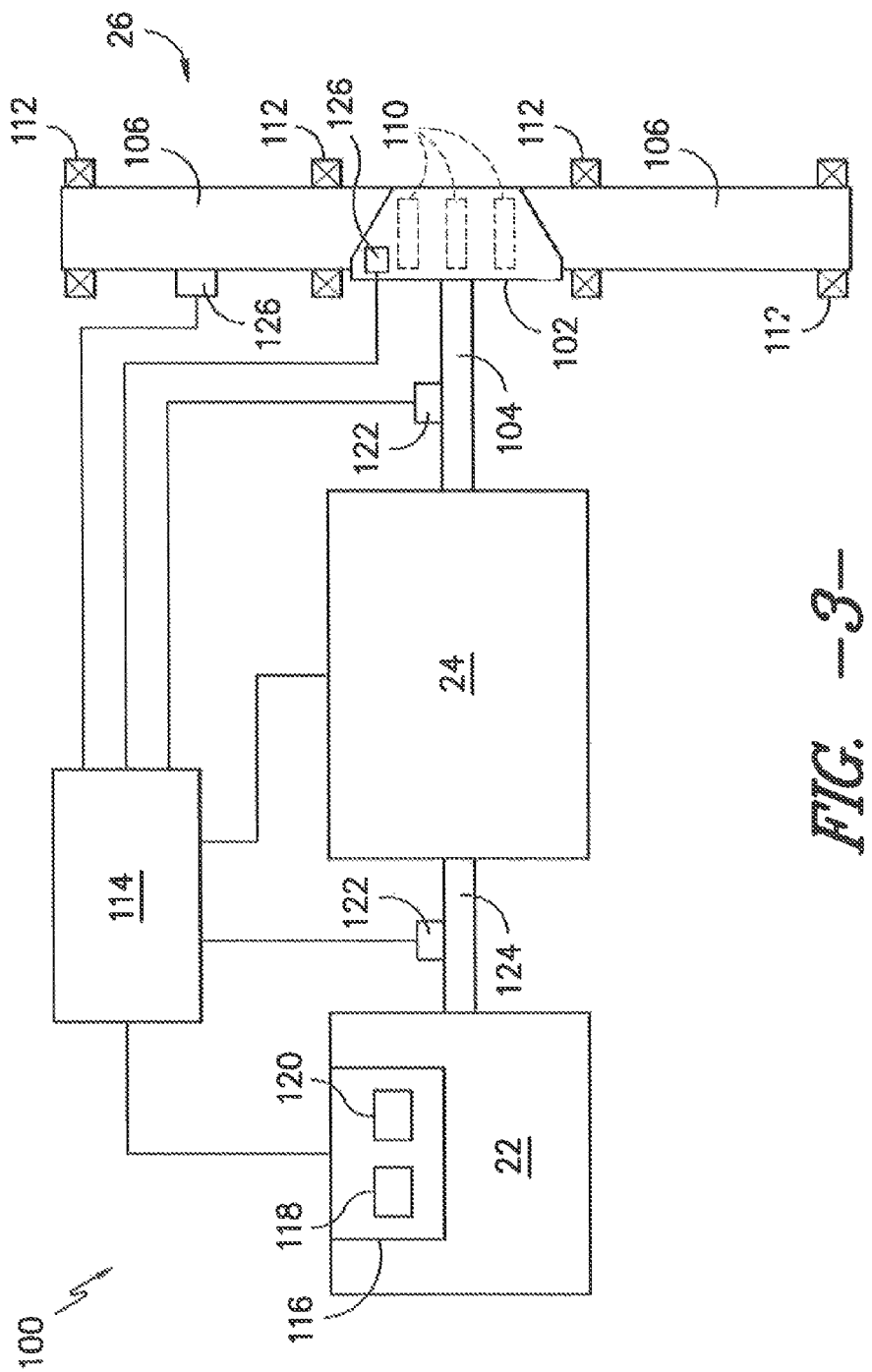
FIG. -3-

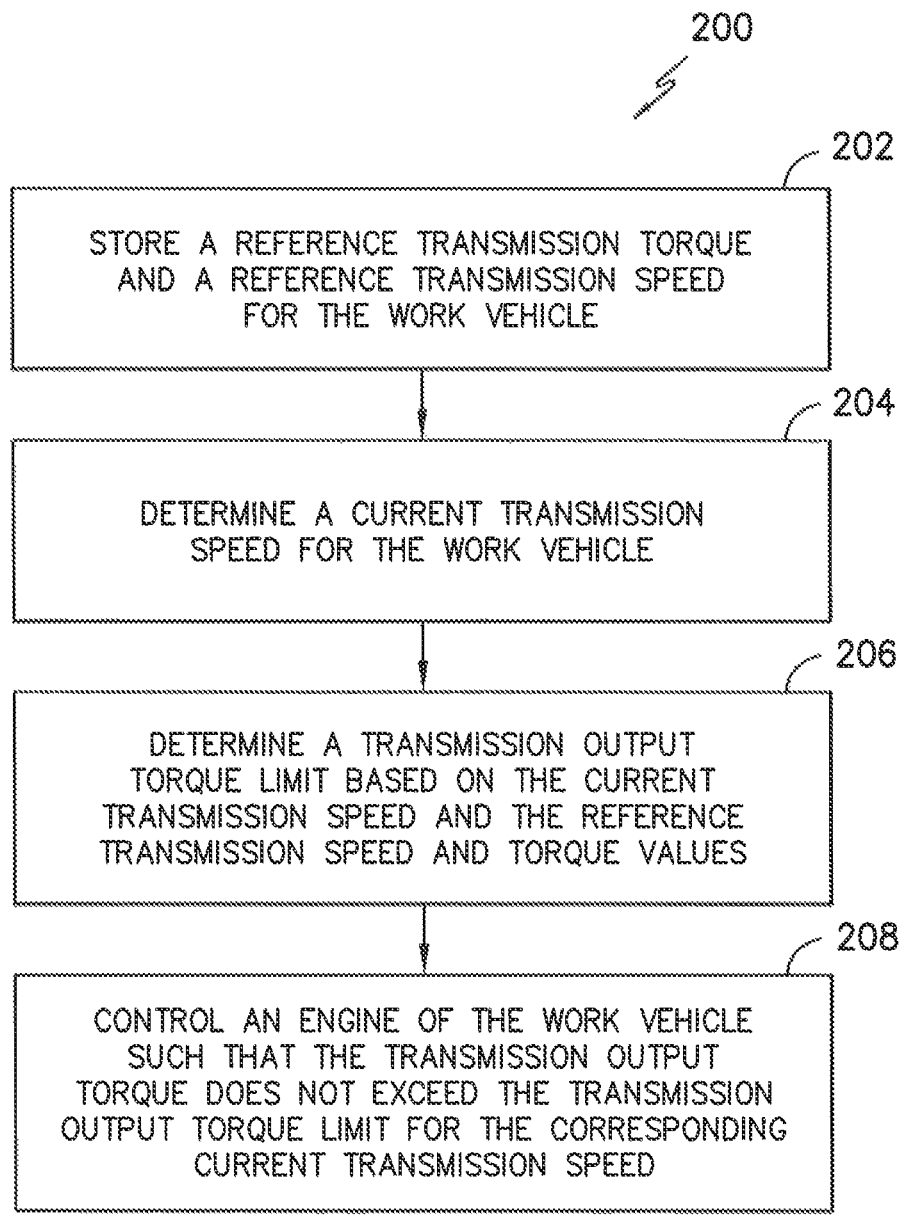
FIG. —4—

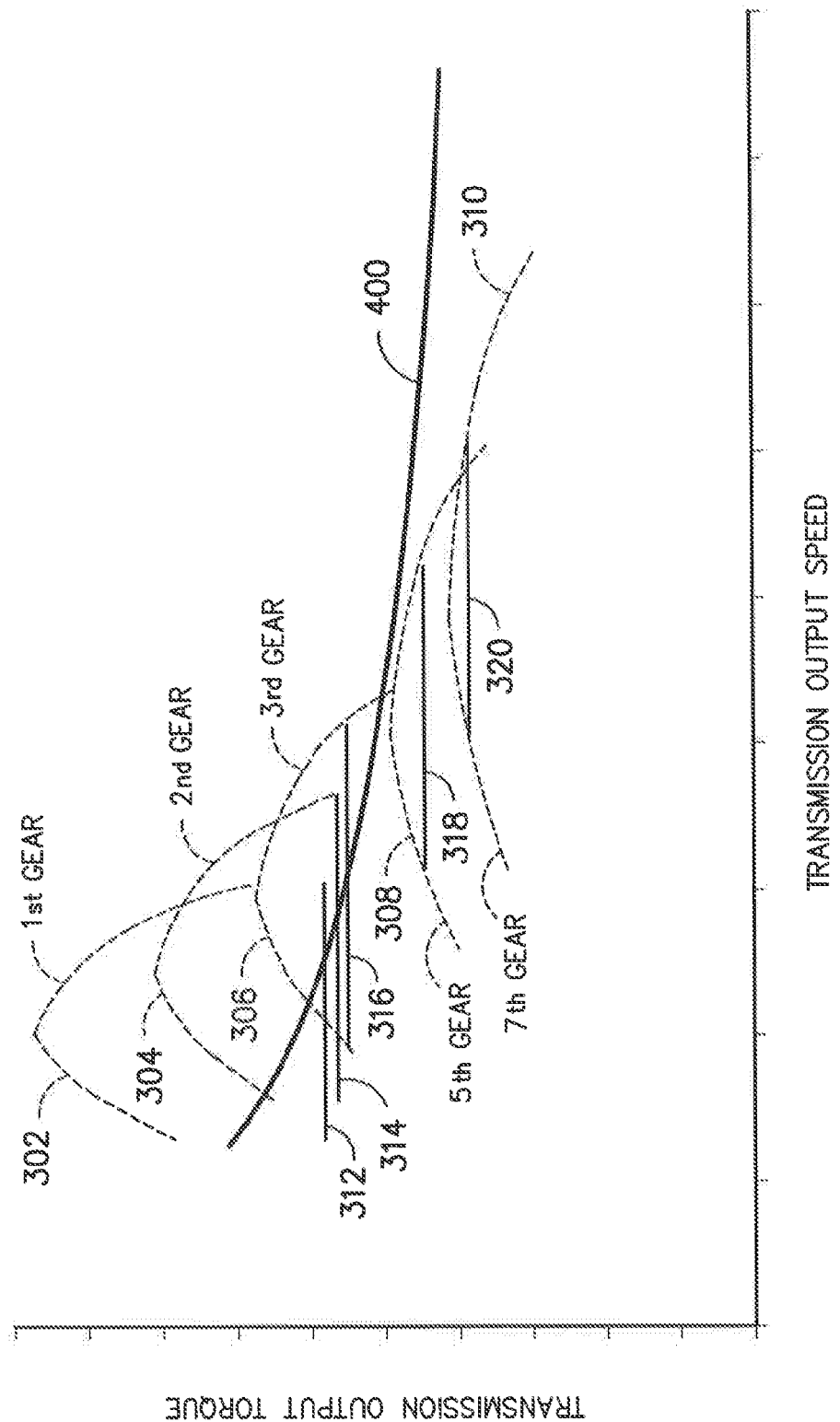
FIG. -5-

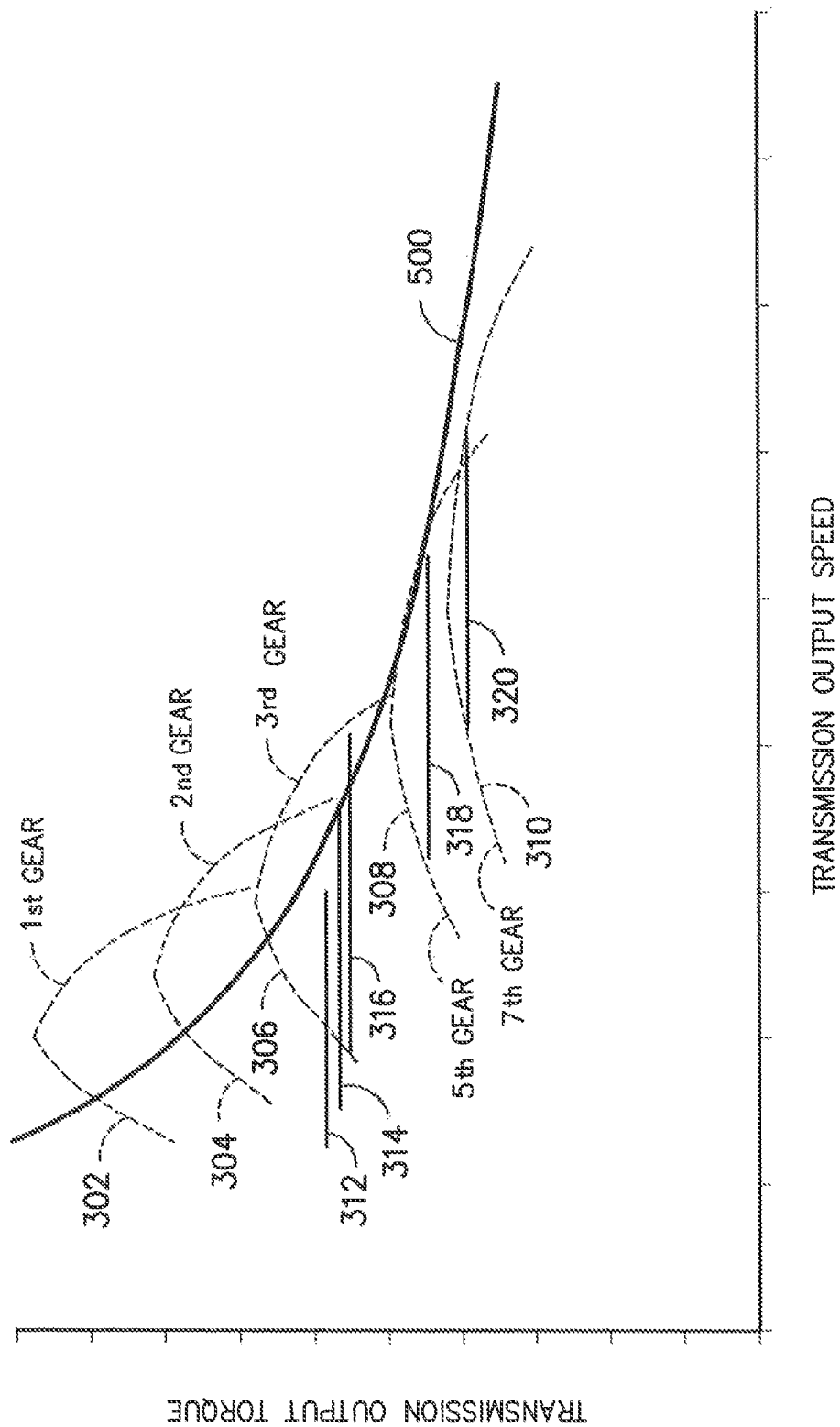
FIG. -6-

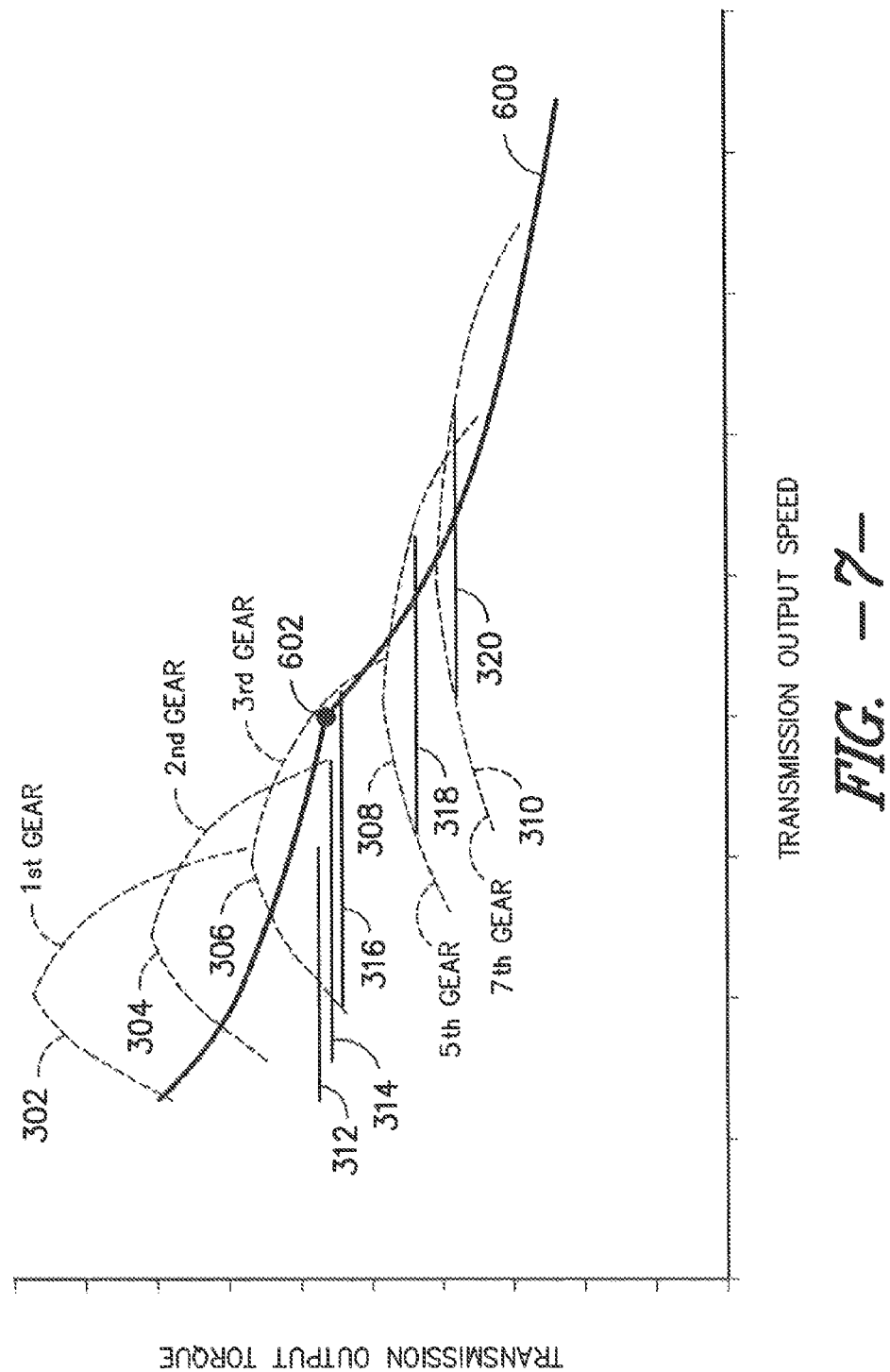
FIG. -7-

SYSTEM AND METHOD FOR ENHANCING THE PERFORMANCE OF A WORK VEHICLE

FIELD OF THE INVENTION

The present subject matter relates generally to work vehicles and, more particularly, to a system and method for enhancing the performance of a work vehicle by providing transmission output torque limits that protect drivetrain components of the vehicle (e.g., drive axle assembly components) from damage while improving the overall "feel" or user experience for the operator.

BACKGROUND OF THE INVENTION

Current work vehicles, such as tractors and other agricultural vehicles, include an electronically controlled engine and a transmission, such as a power shift transmission (PST) or a continuously variable transmission (CVT) coupled to the engine. The transmission is, in turn, coupled to at least one drive axle assembly for transferring torque from the transmission to the vehicle's wheels. As is generally understood, each drive axle assembly may include one or more bearings and/or gears to assist in transmitting torque between the transmission and the drive wheels.

By including an electronically controlled engine within a work vehicle, the torque available from the engine may be controlled accurately. As a result, manufacturers have attempted to protect certain components of the work vehicle by defining specific torque limits for the engine, which in turn, provides corresponding output torque limits for the transmission. Currently, such engine/transmission torque limits have been implemented by defining a fixed torque limit for each gear of the transmission.

For example, FIG. 1 illustrates a chart providing example operating curves and torque limits for a plurality of different transmission gears (for ease of illustration, the example data is only provided for the first, second, third, fifth and seventh transmission gears). As shown, for each gear, a maximum operating curve is defined that corresponds to the maximum transmission output torque and speed combinations that may be achieved for each gear based on the operating limits of the engine (e.g., at the maximum speed and torque limits for the engine). Specifically, the first gear is associated with a first maximum operating curve 302, the second gear is associated with a second maximum operating curve 304, the third gear is associated with a third maximum operating curve 306, the fifth gear is associated with a fifth maximum operating curve 308 and the seventh gear is associated with a seventh maximum operating curve 310. In addition, a fixed engine torque limit is defined for each gear, which, in turn, provides fixed transmission output torque limits for the various gears. For example, as shown in FIG. 1, a first transmission torque limit 312 is defined for the first gear, a second transmission torque limit 314 is defined for the second gear, a third transmission torque limit 316 is defined for the third gear, a fifth transmission torque limit 318 is defined for the fifth gear and a seventh transmission torque limit 320 is defined for the seventh gear. Of course, maximum operating curves and corresponding fixed torque limits may also be defined for any of the other gears of the transmission.

By using such fixed torque limits, an operator may, in certain instances, be provided with a vehicle performance that is less than desirable. For example, when the engine lugs and loses speed as a result of increased vehicle loading, the transmission output speed is also reduced. However, due to the fixed torque limits, the transmission output torque is capped at the corresponding torque limit as the output speed is reduced. This results in an undesirable performance "feel" for the operator and often leads to the operator having to downshift to allow for an increase in engine/transmission torque. In addition to the impact on the overall performance of the work vehicle, the individual torque limits also increase the complexity of developing suitable vehicle control systems. For example, each work vehicle may require a plurality of different torque limits (e.g., one for each gear). Moreover, such torque limits may vary significantly across different vehicle configurations based on the specific capabilities of the components included within each vehicle and the loading requirements for each vehicle.

Accordingly, a system and method that simplifies the manner in which the transmission output torque is limited and that also improves the overall performance "feel" for the operator would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the preset subject matter is directed to a method for enhancing the performance of a work vehicle. The method may generally include storing a reference transmission torque and a reference transmission speed for a transmission of the work vehicle. At least one of the reference transmission torque or the reference transmission speed may be determined based at least in part on drivetrain life data associated with at least one drivetrain component of the work vehicle. In addition, the method may include determining a current transmission speed for the transmission, determining a transmission output torque limit for the transmission based on the current transmission speed, the reference transmission torque and the reference transmission speed and controlling an engine of the work vehicle such that a transmission output torque of the transmission does not exceed the transmission output torque limit while the transmission is being operated at the current transmission speed.

In another aspect, the present subject matter is directed to a system for enhancing the performance of a work vehicle. The system may generally include an engine, a transmission coupled to the engine, at least one drive axle assembly coupled to the transmission and a controller communicatively coupled to the engine and the transmission. The controller may be configured to store a reference transmission torque and a reference transmission speed for the transmission. At least one of the reference transmission torque or the reference transmission speed may be determined based at least in part on drivetrain life data associated with at least one drivetrain component of the work vehicle. In addition, the controller may be configured to determine a current transmission speed for the transmission, determine a transmission output torque limit for the transmission based on the current transmission speed, the reference transmission torque and the reference transmission speed and control an engine of the work vehicle such that a transmission output torque of the transmission does not exceed the transmission output torque limit while the transmission is being operated at the current transmission speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a chart providing example torque/speed operating curves for a plurality of transmission gears, particularly illustrating the chart including conventional, fixed torque limits for the transmission gears;

FIG. 2 illustrates a side view of one embodiment of a work vehicle in accordance with aspects of the present subject matter;

FIG. 3 illustrates a schematic view of one embodiment of a system for enhancing the performance of a work vehicle in accordance with aspects of the present subject matter;

FIG. 4 illustrates a flow diagram of one embodiment of a method for enhancing the performance of a work vehicle in accordance with aspects of the present subject matter;

FIG. 5 illustrates another view of the chart shown in FIG. 1, particularly illustrating an example torque limit curve provided on the chart for defining limits for the transmission output torque as the transmission output speed is varied;

FIG. 6 illustrates a further view of the chart shown in FIG. 1, particularly illustrating another example torque limit curve provided on the chart for defining limits for the transmission output torque as the transmission output speed is varied; and FIG. 7 illustrates yet another view of the chart shown in FIG. 1, particularly illustrating a further example torque limit curve provided on the chart for defining limits for the transmission output torque as the transmission output speed is varied.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed a system and method for enhancing the operating performance of a work vehicle. Specifically, in several embodiments, the disclosed system and method provide for the calculation of a transmission output torque limit based on both the current transmission output speed (which is also the axle input speed) and reference torque/speed values using an exponential formula that permits the output torque to be increased as the output speed is reduced (as opposed to the flat torque curves provided by conventional, fixed torque limits). As a result, if the engine lugs and loses speed (thereby causing the transmission output speed to decrease), the transmission output torque may be allowed to increase. Such an increase in torque may provide a better performance "feel" to the operator and may also reduce the need to downshift in order to provide increased power.

Additionally, in several embodiments, the reference speed/torque values used to calculate the transmission output torque limit may be determined based at least in part on drivetrain life data associated with one or more drivetrain components of the work vehicle (e.g., one or more transmission components, such as one or more clutches, and/or one or more drive axle assembly components, such as one or more bearings and/or gears). For example, the reference speed and/or torque values may be calculated using a Stress-Number (S-N) curve or any other suitable mathematical relationship that correlates component life (e.g., as a function of operating hours) to the operational parameters of the drive axle component(s) (e.g., the rotational speed and/or loading on the component(s)). As such, in addition to providing for enhanced performance "feel," the torque limits determined utilizing the disclosed methodology may account for the loading capabilities and expected component lives of the drivetrain components, thereby preventing unexpected damage to such component(s) due to excessive output torques.

Referring now to FIG. 2, a side view of one embodiment of a work vehicle 10 is illustrated in accordance with aspects of the present subject matter. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 2, the work vehicle 10 includes a pair of front wheels 12, a pair or rear wheels 14 and an articulated chassis 16 coupled to and supported by the wheels 12, 14. An operator's cab 18 may be supported by a portion of the chassis 16 and may house various input devices, such as a control lever 20 and/or a foot pedal 21, for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via one or more drive axle assemblies 26. The transmission 24 and drive axle assembly(ies) 26 may collectively define a drivetrain 28 of the work vehicle 10.

It should be appreciated that the configuration of the work vehicle 10 described above and shown in FIG. 2 is provided only to place the present subject matter in an exemplary field of use. Thus, it should be appreciated that the present subject matter may be readily adaptable to any manner of work vehicle configuration 10. For example, in an alternative embodiment, the work vehicle 10 may include a fixed frame chassis as opposed to an articulated chassis. Additionally, although not shown, the work vehicle 10 may also be configured to be operably coupled to any suitable type of work implement, such as a trailer, spray boom, manure tank, feed grinder, plow and/or the like.

Referring now to FIG. 3, a schematic diagram of one embodiment of a system 100 for enhancing the performance of a work vehicle 10 is illustrated in accordance with aspects of the present subject matter. As shown, the system 100 may include various components of the work vehicle 10, such as the engine 22, the transmission 24 and the drive axle assembly 26. As is generally understood, the drive axle assembly 26 may include a differential 102 coupled to an output shaft 104 of the transmission 24 and one or more axle shafts 106 coupled to the differential 102 for transferring power to the drive wheels of the vehicle 10 (e.g., the rear wheels 14). In addition, the drive axle assembly 26 may include various other components, such as one or more gears 110 and/or one or more bearings 112 for assisting in transmitting power from the transmission 24 to the drive wheels. It should be appreciated that, although a single drive axle assembly 26 is shown, the work vehicle 10 may include any other number of drive axle assemblies 26, such as two drive axle assemblies 26.

As shown in FIG. 3, the system 100 may include a controller 114 configured to control the operation of one or more components of the work vehicle 10, such as the engine 22 and the transmission 24. For example, the controller 114 may be communicatively coupled to an engine governor 116 in order to control and/or monitor the speed and/or torque of the engine 24. Similarly, the controller 114 may be coupled to various components of the transmission 24 (e.g., one or more clutch valves, swash plate actuators and/or the like) in order to control the operation of the transmission 24.

It should be appreciated the controller 114 may generally comprise any suitable processor-based device known in the art. Thus, in several embodiments, the controller 114 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 114 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 114 to perform various computer-implemented functions, such as the method 200 described below with reference to FIG. 4. In addition, the controller 114 may also include various other suitable components, such as a communications circuit or module, one or more input/output channels, a data/control bus and/or the like.

The system 100 may also include one or more sensors for monitoring various operating parameters of the work vehicle 10. For example, as shown in FIG. 3, the controller 114 may be communicatively coupled to various sensors, such as a torque sensor 118 and/or a speed sensor 120, mounted on and/or within the engine 22 for monitoring the engine torque and/or the engine speed. In one embodiment, the sensor(s) 118, 120 may comprise an internal sensor of the engine governor 116. In another embodiment, the sensor(s) 118, 120 may comprise a separate sensor(s) configured to monitor the torque loads and/or the speed of the engine 22.

Moreover, the system 100 may also include one or more sensors 122 (e.g., shaft encoders, shaft sensors and/or any other suitable speed sensors) configured to monitor the rotational speeds of the various shafts of the transmission 24. For example, as shown in FIG. 3, the transmission 24 may include a speed sensor 122 mounted to and/or within the transmission input shaft 124 and/or the transmission output shaft 104 to measure the input and/or output speeds of the transmission 24. The speed sensors 122 may, in turn, be communicatively coupled to the controller 114 to permit the speed measurements to be transmitted to the controller 114 for subsequent processing and/or analysis.

In addition, the system 100 may include various other sensors configured to monitor any other suitable operating parameters of the work vehicle 10. For example, in one embodiment, a sensor(s) 126 may be associated with the drive axle assembly 26 for monitoring one or more operating parameters of the assembly 26, such as a torque load transmitted through the assembly 26 or a rotational speed of one or more components of the assembly 26.

Referring now to FIG. 4, a flow diagram of one embodiment of a method 200 for enhancing the performance of a work vehicle 10 is illustrated in accordance with aspects of the present subject matter. In general, the method 200 will be described with reference to the work vehicle 10 and system 100 described above with reference to FIGS. 2 and 3. However, it should be appreciated by those of ordinary skill in the art that the disclosed method 200 may generally be utilized to enhance the performance of any work vehicle have any suitable configuration and being controlled by any suitable control system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, as (202), the method 200 includes storing a reference transmission torque and a reference transmission speed for the work vehicle 10. Specifically, in several embodiments, a reference transmission output torque value and a reference transmission output speed value may be stored within the memory device(s) of the controller 114. As will be described below, such reference parameters may be utilized by the controller 114 for determining a suitable torque limit(s) for controlling the operation of the engine 22. It should be appreciated that, as used herein, the controller 114 may be "storing" the reference torque and speed parameters at any time that such parameters are contained within the controller's memory. Thus, the terms "store," "stored" and "storing" need not be limited to the initial act of recording or saving one or both of the reference parameters within the controller's memory.

In several embodiments, the reference torque value and/or the reference speed value may be determined based at least in part on drivetrain life data associated with one or more drivetrain components of the work vehicle 10. For example, in a particular embodiment, the reference torque and/or speed value may be determined as a function of an anticipated or desired component life of one or more of the components of the drive axle assembly 26, such as one or more of the bearings 112 and/or gears 110 of the assembly 26. Such components typically exhibit a component life that is a function of the loading applied through the component(s) (e.g., according to an associated Stress-Number (S-N) curve or relationship). For example, the anticipated life for a bearing 112 may be expressed by the following equation (Equation (1)):

$$L = \left(\frac{C}{P}\right)^x * \frac{16,667}{n} \qquad (1)$$

wherein, L corresponds to the component life for the bearing 112 as a function of hours, C corresponds to the loading capability for the bearing 112 (or base dynamic load rating), P correspond to the actual loading on the bearing 112 (or equivalent dynamic bearing load), x corresponds to a bearing life exponent (e.g., typically 3 for ball bearings and 3.33 for roller bearings) and n corresponds to the speed at which the bearing 112 is rotated in RPMs.

Using the above equation, reference transmission output speed and torque values may be selected and/or calculated in a manner that provides for a desired component life for the bearing(s) 112 of the drive axle assembly 26. For example, in one embodiment, it may be desirable for the bearing(s) 112 to have a given component life at a selected reference transmission output speed. In such an embodiment, the selected reference speed may be converted into a rotational speed (n) for the bearing(s) 112 and input into Equation (1) along with the desired component life (in hours) and the known loading capability for the bearing(s) 112. The equation may then be solved to determine the actual loading (P) needed to achieved the desired component life while rotating the bearing(s) 1112 at the selected rotational speed. A simple loading analysis based on the bearing configuration may then be performed to determine the transmission output torque (i.e., the reference torque value) that must be applied to provide the calculated loading (P).

It should be appreciated that, as an alternative to selecting a desired component life and a reference speed value, a similar analysis may also be performed to determine a reference transmission output speed value based on a selected transmission output torque value (i.e., a reference torque value) and a desired component life. Specifically, the selected reference torque value may be utilized to determine the corresponding loads (P) applied through the bearing(s) 112 via a suitable loading analysis. Such loads, together with the desired component life, may then be input into Equation (1) to determine the corresponding reference speed value.

It should also be appreciated that similar equations and/or loading analyses may also be utilized to determine reference torque and/or speed values based on the drivetrain life data associated with any other suitable drivetrain components of the work vehicle 10. For example, the gears 110 of the drive axle assembly 26 may experience similar fatigue conditions to those of the bearings 112 (i.e., repeated application of compressive loads) and may similarly exhibit a component life that is a function of loading and operational speed. Thus, a similar analysis may be used to determine a given combination of reference speed and torque values necessary to achieve a specific component life for the drive axle gear(s) 110. In another embodiment, the reference torque and/or speed values may be determined based on the drivetrain life data associated with any suitable components of the transmission 24, such as the transmission clutches.

By analyzing the available drivetrain life data for each component within the vehicle's drivetrain, the component serving as the limiting component for the system 100 may be identified. For instance, each component may be analyzed using the same reference speed value and component life (e.g., a specific number of hours) as inputs in order to determine the corresponding reference torque values. The drivetrain component having the lowest reference torque value may then be identified as the limiting component for the system 100. In several embodiments, the reference speed and torque values associated with the limiting component may be stored within the controller's memory and subsequently utilized by the controller 114 to determine the corresponding torque limit(s) for controlling the operation of the engine 22.

Additionally, it should be appreciated that, in several embodiments, the reference speed and torque values may be predetermined and subsequently stored within the controller's memory. For instance, suitable analyses may be performed for a plurality of work vehicles 10 having different vehicle configurations based on the drivetrain life data and loading capabilities associated with each vehicle's drivetrain components to determine unique reference speed and torque values for each vehicle configuration. The reference speed and torque values for each vehicle configuration may then be stored within each controller 114 installed onto a work vehicle 10 having such configuration. Alternatively, the controller 114 may be configured to automatically determine the reference torque value and/or the reference speed value based on suitable inputs provided to the controller 114. For example, in one embodiment, suitable equations and/or other mathematical functions may be stored within the controller's memory that allow the controller 114 to determine a reference torque value (or a reference speed value) using a selected component life and a selected reference speed value (or a selected reference torque value) as inputs.

Referring still to FIG. 4, at (204), the method 200 includes determining a current transmission speed for the work vehicle 10. Specifically, as indicated above, the controller 114 may be coupled to one or more speed sensors 120, 122 configured to directly or indirectly monitor the current transmission input and output speeds. Thus, by receiving suitable measurement signals from the speed sensor(s) 120, 122, the controller 114 may be configured to determine both the current input speed (i.e., the engine speed) and the current output speed for the transmission 24.

At (206), the method 200 includes determining a transmission output torque limit based on the current transmission speed and the reference transmission speed and torque values stored within the controller's memory. In general, it should be appreciated that the transmission output torque limit may be determined based on the current transmission speed and the reference speed/torque values using any suitable mathematical relationship (e.g., an exponential formula) that allows the torque limit to be increased as the transmission output speed is reduced. As such, when the engine 22 is loaded and loses speed (thereby causing a reduction in the transmission output speed), the engine torque (and, thus, the transmission output torque) may be allowed to increase without requiring the transmission 24 to be downshifted. This allowable increase in torque generally provides for an improved performance "feel" to the operator as the engine 22 is allowed to react to increased vehicle loads with increased power. In contrast, conventional, fixed torque limits result in flat spots on the torque curve that can make the engine 22 feel "gutless" or weak.

In several embodiments, the transmission output torque limit may be determined by using the following equation (Equation (2)):

$$T_{lim} = T_{ref} * \left(\frac{S_{ref}}{S_{actual}}\right)^m \quad (2)$$

wherein, $T_{lim}$ corresponds to the transmission output torque limit, $T_{ref}$ corresponds to the reference transmission torque stored within the controller's memory, $S_{ref}$ corresponds to the reference transmission speed stored within the controller's memory, $S_{actual}$ corresponds to the current transmission speed and m corresponds to a torque limit exponent.

Using the above equation, a torque limit curve may be developed that allows for increased transmission output torques as the transmission output speed is reduced in order to provide the desired performance "feel" for the operator. Moreover, since the transmission output torque limit is calculated based on the reference torque and speed values, it can be ensured that the calculated torque limit does not allow for the transmission output torque to be increased to a level that would degrade or otherwise reduce the anticipated or desired component lives for the various drivetrain components.

For example, FIG. 5 illustrates an example torque limit curve 400 calculated using Equation (2) in accordance with aspects of the present subject matter. The torque limit curve 400 was determined using a torque limit exponent (m) of 0.3 and is illustrated together with the conventional, fixed torque limits of FIG. 1 for comparison purposes. As shown, unlike the fixed torque limits 312, 314, 316, 318, 320, the torque limit curve 400 generally allows for an increase in torque as the transmission output speed is reduced, particularly at the lowest gears. For example, when operating in the first, second or third gear, the transmission output torque may be steadily increased as the transmission output speed is reduced along the speed ranges associated with each gear. Moreover, as shown in FIG. 5, the torque limit curve crosses over each fixed torque limit 312, 314, 316 for the first, second and third gears as the transmission output speed is reduced, thereby allowing for heightened output torques for such gears. Additionally, using the calculated torque curve 400, it may be determined that the specific torque limits are unnecessary for one or more of the transmission gears. For instance, as shown in FIG. 5, the torque limit curve 400 extends above the maximum operating curves 308, 310 for the fifth and seventh gears. Thus, such gears may be operated along their maximum operating curves 308, 310 without reference to the torque limit curve 400.

FIG. 6 illustrates another example of a torque limit curve 500 calculated using Equation (2) in accordance with aspects of the present subject matter. In this example, the torque limit curve 500 was determined using a torque limit exponent (m) of 0.6. By adjusting the torque limit exponent, the slope of the curve 500 may be varied, particularly along the speed ranges associated with the lower gears. For instance, as shown in FIG. 6, the illustrated curve 500 may allow for the transmission output torque to be increased even further than that shown in FIG. 5 for the first, second and third gears as the transmission output speed is reduced.

FIG. 7 illustrates yet another example of a torque limit curve 600 calculated using Equation (2) in accordance with aspects of the present subject matter. In this example, the torque limit curve 600 was determined using a torque limit exponent (m) of 1.0 for output speeds above a given speed threshold (indicated at point 602) and a torque limit exponent (m) of 0.3 for output speeds below the speed threshold 602. By varying the torque limit exponent across differing speed ranges, the slope of the curve 600 may be tailored to enhance the performance of the vehicle 10 in relation to its operation within the gear(s) associated with such speed range(s).

It should be appreciated that, when calculating the transmission output torque limit for the current transmission output speed, the torque limit exponent (m) may generally correspond to any suitable value. For example, in several embodiments, a suitable torque limit exponent may correspond to a value ranging from about 0.3 to about 1.0, such as a value ranging from about 0.3 to about 0.6 or from about 0.33 to about 1.0 and any other subranges therebetween. Additionally, in several embodiments, the torque limit exponent may be selected based on a life exponent associated with the drivetrain life data for one or more of the drivetrain components. For example, when the reference speed and torque values relate to the component life of a bearing 112 of the drive axle assembly 26, the torque limit exponent selected for calculating the transmission output torque limit may correspond to the inverse of the bearing life exponent used to determine the reference speed and/or torque values (i.e., exponent x from Equation (1)), such as by selecting a torque limit exponent of ⅓ or 0.33 for ball bearings (e.g. due to the bearing life exponent of 3) or by selecting a torque limit exponent of 1/3.33 or 0.3 for roller bearings (e.g. due to the bearing life exponent of 3.33)

It should also be appreciated that, when varying the torque limit exponent across differing speed ranges, the speed threshold 602 selected may generally correspond to any suitable output speed. In addition, although FIG. 7 illustrates an example using two different torque limit exponents over two different speed ranges, any number of exponents may be used to vary the corresponding torque limit curve across any corresponding number of different speed ranges.

Referring back to FIG. 4, at (208), the method 200 includes controlling the engine 22 of the work vehicle such that the transmission output torque does not exceed the calculated transmission output torque limit for the corresponding transmission output speed. Specifically, by determining the transmission output torque limit for the work vehicle 10 at the current transmission output speed, the controller 214 may be configured to limit the engine torque to ensure that the transmission output torque does not exceed the calculated torque limit. For example, using the current gear ratio of the transmission 24, the controller 114 may be configured to calculate an engine torque limit corresponding to the transmission torque limit. The controller 114 may then control the operation of the engine (e.g., via the engine governor 116) so that the engine torque does not exceed the calculated engine torque limit, thereby maintaining the transmission output torque at or below the corresponding transmission torque limit.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for enhancing the performance of a work vehicle, the method comprising:
   storing a reference transmission torque and a reference transmission speed for a transmission of the work vehicle, at least one of the reference transmission torque or the reference transmission speed being determined based at least in part on drivetrain life data associated with at least one drivetrain component of the work vehicle;
   determining a current transmission speed for the transmission;
   determining a transmission output torque limit for the transmission based on the current transmission speed, the reference transmission torque and the reference transmission speed; and
   controlling an engine of the work vehicle such that a transmission output torque of the transmission does not exceed the transmission output torque limit while the transmission is being operated at the current transmission speed.

2. The method of claim 1, wherein the drivetrain life data corresponds to a desired component life for the at least one drivetrain component, wherein the reference transmission torque corresponds to a transmission output torque for achieving the desired component life for the at least one drivetrain component at the reference transmission speed.

3. The method of claim 1, wherein the reference and current transmission speeds correspond to transmission output speeds.

4. The method of claim 1, wherein determining the transmission output torque limit comprises determining the transmission output torque limit based on the reference transmission torque, the reference transmission speed and the current transmission speed using a mathematical relationship that results in the transmission output torque limit increasing as the current transmission speed is reduced.

5. The method of claim 4, wherein determining the transmission output torque limit comprises determining the transmission output torque limit based on the reference transmission torque, the reference transmission speed and the current transmission speed using the following equation:

$$T_{lim} = T_{ref} * \left(\frac{S_{ref}}{S_{actual}}\right)^m$$

wherein, $T_{lim}$ corresponds to the transmission output torque limit, $T_{ref}$ corresponds to the reference transmission torque, $S_{ref}$ corresponds to the reference transmission speed, $S_{actual}$ corresponds to the current transmission speed and m corresponds to a torque limit exponent.

6. The method of claim 5, wherein the torque limit exponent is selected based on a life exponent for the at least one drivetrain component.

7. The method of claim 5, wherein the torque limit exponent ranges from about 0.3 to about 1.0.

8. The method of claim 1, further comprising determining an engine torque limit for the engine based on the transmission output torque limit and a current gear ratio of the transmission.

9. The method of claim 8, wherein controlling the engine comprises controlling engine torque of the engine based on the engine torque limit such that the transmission output torque does not exceed the transmission output torque limit while the transmission is being operated at the current transmission speed.

10. The method of claim 1, wherein the at least one drivetrain component comprises a gear or a bearing of a drive axle assembly of the work vehicle.

11. A system for enhancing the performance of a work vehicle, the system comprising:
an engine;
a transmission coupled to the engine;
at least one drive axle assembly coupled to the transmission; and
a controller communicatively coupled to the engine and the transmission, the controller being configured to:
store a reference transmission torque and a reference transmission speed for the transmission, at least one of the reference transmission torque or the reference transmission speed being determined based at least in part on drivetrain life data associated with at least one drivetrain component of the work vehicle;
determine a current transmission speed for the transmission;
determine a transmission output torque limit for the transmission based on the current transmission speed, the reference transmission torque and the reference transmission speed; and
control an engine of the work vehicle such that a transmission output torque of the transmission does not exceed the transmission output torque limit while the transmission is being operated at the current transmission speed.

12. The system of claim 11, wherein the drivetrain life data corresponds to a desired component life for the at least one drivetrain component, wherein the reference transmission torque corresponds to a transmission output torque for achieving the desired component life for the at least one drivetrain component at the reference transmission speed.

13. The system of claim 12, wherein the reference and current transmission speeds correspond to transmission output speeds.

14. The system of claim 11, wherein the controller is configured to determine the transmission output torque limit based on the reference transmission torque, the reference transmission speed and the current transmission speed using a mathematical relationship that results in the transmission output torque limit increasing as the current transmission speed is reduced.

15. The system of claim 14, wherein the controller is configured to determine the transmission output torque limit based on the reference transmission torque, the reference transmission speed and the current transmission speed using the following equation:

$$T_{lim} = T_{ref} * \left(\frac{S_{ref}}{S_{actual}}\right)^m$$

wherein, $T_{lim}$ corresponds to the transmission output torque limit, $T_{ref}$ corresponds to the reference transmission torque, $S_{ref}$ corresponds to the reference transmission speed, $S_{actual}$ corresponds to the current transmission speed and m corresponds to a torque limit exponent.

16. The system of claim 15, wherein the torque limit exponent is selected based on a life exponent for the at least one drivetrain component.

17. The system of claim 15, wherein the torque limit exponent ranges from about 0.3 to about 1.0.

18. The system of claim 11, wherein the controller is further configured to determine an engine torque limit for the engine based on the transmission output torque limit and a current gear ratio of the transmission.

19. The system of claim 18, wherein the controller is configured to control the engine based on the engine torque limit such that the transmission output torque does not exceed the transmission output torque limit while the transmission is being operated at the current transmission speed.

20. The system of claim 11, wherein the at least one drivetrain component comprises a gear or a bearing of the drive axle assembly.

* * * * *